Patented Sept. 9, 1947

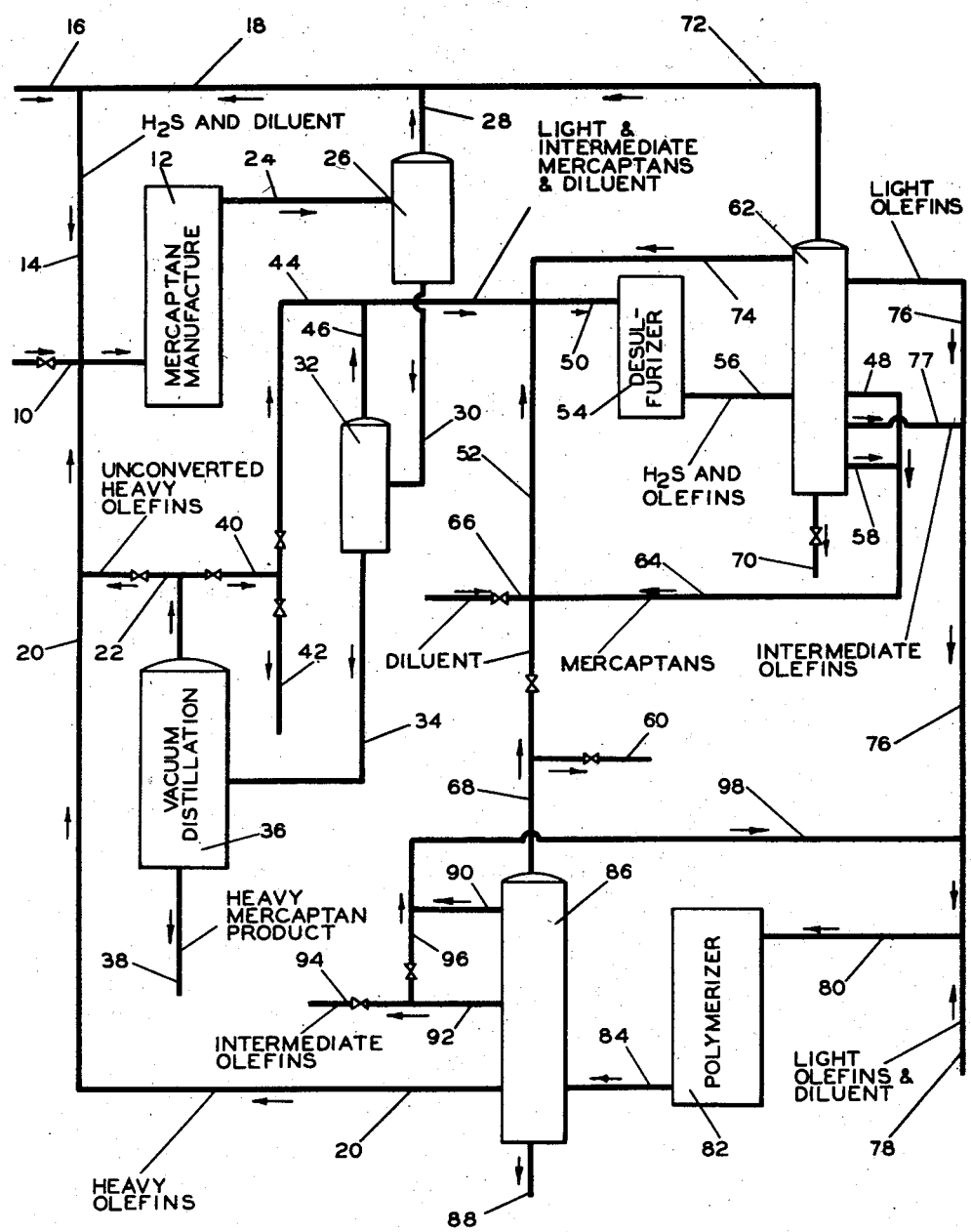

2,427,309

UNITED STATES PATENT OFFICE 2,427,309

PRODUCTION OF MERCAPTANS

Walter A. Schulze, Bartlesville, Okla., assignor to Phillips Petroleum Company, a corporation of Delaware Application December 31, 1943, Serial No. 516,482

10 Claims. (Cl. 260—609)

This invention relates to the production of mercaptans. In a specific embodiment it relates to the production of relatively high molecular weight mercaptans, preferably those having at least eight carbon atoms per molecule, by reacting olefin polymers with hydrogen sulfide. An important aspect of the invention is the recovery of olefinic and hydrogen sulfide constituents of lower molecular weight mercaptans produced as by-products in a mercaptan-forming reaction, and converting said constituents to additional desired heavy mercaptan product. A preferred embodiment of the invention involves an integrated process for converting low-boiling olefin hydrocarbons and hydrogen sulfide to give maximum yields of high-boiling mercaptans of exceptional value as synthetic rubber modifiers.

It is known to react olefinic hydrocarbons such as ethylene and its higher homologs, diolefins, etc., with hydrogen sulfide to produce the corresponding mercaptans both in the absence of and in the presence of a catalyst. When the higher olefins are reacted, for instance butylenes or higher, and particularly in the reaction of olefin polymers, the formation of the corresponding mercaptans having the same number of carbon atoms per molecule occurs to a greater or smaller extent depending upon the reaction conditions used; however, in practically all circumstances, even when an exceptionally selective catalyst is employed, substantial amounts of mercaptans having a fewer number of carbon atoms per molecule than the olefinic reactant are formed. Such lower mercaptans may be only a few per cent of the total mercaptan product or may even constitute the predominant part of the product. The latter is particularly the case when a non-catalytic reaction is carried out, in which temperatures of about 500° F. and higher are ordinarily required. This formation of lower-boiling mercaptans is postulated to be the result of a depolymerization or cracking of the olefinic reactant followed by reaction of hydrogen sulfide with the lower-boiling olefins so formed, although other explanations for the phenomenon may be advanced.

Catalytic processes with particular emphasis on the manufacture of low molecular weight mercaptans have been advanced. Recommended solid contact catalysts include: metallic sulfides, fuller's earth, silica gel and charcoal. The activity of these catalysts leaves much to be desired since temperatures of 400-500° F. are often necessary to effect reaction at a practical rate. Adsorptive clays of the fuller's earth type have been proposed as catalysts for this reaction. Such catalysts are in some cases suitable for the production of relatively low molecular weight mercaptans because of their pronounced depolymerizing activity toward the higher olefins. However, this property often results in an inefficient process when high boiling mercaptans are desired.

In my copending application Serial No. 493,463, filed July 5, 1943, I have disclosed a method of producing mercaptans, particularly the higher boiling ones, by reaction of olefins with hydrogen sulfide in the presence of a synthetic gel catalyst comprising a major portion of silica and a minor portion of an oxide of a metal belonging to one of the groups 3B and 4A of the periodic system as listed in "Modern Inorganic Chemistry" by J. W. Mellor (Longman's, Green & Co. (1939) revised and edited by G. D. Parker). While such a catalyst, as exemplified by a silica-alumina catalyst, is quite selective in connection with the reaction of higher molecular weight olefins with hydrogen sulfide to produce corresponding mercaptans, a small amount of lower-boiling mercaptans is usually formed when operating under conditions optimum for the production of the heavy mercaptans. While the amount of lower-boiling mercaptans so formed is quite limited, and is not nearly so serious as in the case of other catalysts heretofore suggested, it nevertheless represents an appreciable loss of raw materials when a commercial installation is considered. As examples of other catalysts which may be used advantageously in the mercaptan-forming reaction may be mentioned hydrogen fluoride, hydrated boron trifluoride, and an addition compound of boron trifluoride with an acid of phosphorus as disclosed in other copending applications of which I am a coinventor. Such catalysts, while more selective than many others previously proposed, also allow a limited production of lower mercaptans.

It is an object of this invention to provide an improved process for the manufacture of mercaptans.

Another object of the invention is to manufacture relatively high-boiling mercaptans by the direct addition of hydrogen sulfide to olefins containing 8 or more carbon atoms per molecule.

A further object is to provide a process for the manufacture of heavy mercaptans in which increased yields thereof are obtainable in comparison with previously known methods.

A further object is to convert low-boiling olefins and hydrogen sulfide to mercaptans having a larger number of carbon atoms per molecule than said olefins.

A further object is to recover olefinic and hydrogen sulfide constituents of relatively low-boiling mercaptans formed as by-products in the reaction of olefin polymers with hydrogen sulfide to produce high-boiling mercaptans having the same number of carbon atoms as said olefin polymers, and to convert one or more of the thus-recovered constituents into further amounts of high-boiling mercaptans.

An additional object of this invention is to provide for the use of low-boiling paraffinic diluents in at least two stages in processes of the type described.

Another object is to produce relatively high molecular weight alkyl mercaptans which are especially desirable modifiers in the manufacture of synthetic rubber of the Buna-type, as exemplified by copolymers of diolefins with vinyl compounds such as styrene, acrylonitrile, esters of acrylic acid, etc.

Further objects and advantages of the invention will be apparent, to one skilled in the art, from the accompanying disclosure and discussion.

In accordance with a preferred modification of the invention, low-boiling mono-olefins such as propylene, butylenes, or mixtures of the same are subjected to polymerization, preferably catalytic, to form high yields of olefin polymers having from 12 to 14 carbon atoms per molecule. Such heavy polymers are recovered from effluents of the polymerization step and passed to a mercaptan-forming step in admixture with a molar excess of hydrogen sulfide, together with a low-boiling paraffinic diluent such as propane. The admixture of polymers, hydrogen sulfide and diluent is contacted with a suitable catalyst to produce the corresponding mercaptans having substantially the same number of carbon atoms per molecule as the polymers. The choice of catalyst will generally be made on the basis of an economic evaluation involving specificity of catalyst in producing high yields of the desired heavy mercaptan, the activity of the catalyst at various temperature levels and flow rates of reaction materials, and the cost of catalyst. Ordinarily I prefer to utilize a synthetic gel-type catalyst comprising silica activated with alumina and/or zirconia or other metal oxides of groups 3B or 4A of the periodic system. However, in some cases it will be preferable to utilize other catalysts which, although producing larger percentages of low-boiling and intermediate-boiling mercaptans, may be appreciably cheaper than a synthetic catalyst of the type described. It is also possible, in some embodiments of my invention, to carry out the mercaptan-forming reaction in the absence of a catalyst, but this is seldom advantageous when reacting polymers of such high molecular weight.

Upon completion of the mercaptan-forming reaction to a desired extent, for example, 30 per cent conversion per pass, separation is made between lower-boiling mercaptans (predominantly butyl and octyl mercaptans) and the desired high-boiling mercaptan product. Such a separation is preferably accomplished in a manner which produces a fraction containing the light and/or intermediate mercaptans in admixture with a portion of the propane or other light paraffinic diluent. These lower-boiling mercaptans, which are ordinarily considered as waste products inasmuch as the purpose of the process is to produce high-boiling mercaptans, are next passed together with the diluent at elevated temperatures into contact with a desulfurization catalyst, for example bauxite or one or more metal sulfides. In this manner the mercaptans are decomposed to form hydrogen sulfide and the corresponding olefins. Less preferably, the desulfurization may be effected in the absence of a catalyst. The reaction is preferably carried out under conditions giving only partial conversion per pass, and unconverted mercaptans are separated and recycled. While the presence of a diluent in this step is not essential it is highly advantageous, particularly when it is readily obtainable from the previous step of the process as in the manner described. The desulfurization products are separated to obtain hydrogen sulfide which is returned to the mercaptan-forming reaction, diluent, if present, which is also returned to the mercaptan-forming reaction, or which may be partly or totally recycled to the desulfurization, and relatively low-boiling olefins. The olefins so recovered are returned to the polymerization step wherein they undergo conversion to heavy olefin polymers and thus are effectively recovered for the production of higher ultimate yields of heavy mercaptans than would otherwise be obtainable.

In another advantageous embodiment of my invention a light paraffinic diluent such as butane is utilized in the polymerization step in admixture with the light olefin feed thereto. This diluent is separated from polymerization products and at least a portion thereof passed to the desulfurization step for use as diluent therein. After passage over the desulfurizing catalyst the butane or other diluent is recovered in a fraction along with light olefins produced by the desulfurization, and this fraction is returned to the polymerizer in which the butane again acts as diluent and the so-recovered light olefins are converted to polymers.

The invention may perhaps be more fully understood by reference to the accompanying drawing which represents in schematic form one arrangement of apparatus suitable for carrying the process into effect. It will be appreciated that the representation is diagrammatic, and that numerous auxiliary pieces of equipment such as valves, pumps, heat exchangers, coolers, compressors, control instruments, fractionator reboilers, injectors or other method of producing vacuums, and the like, can readily be supplied by one skilled in the art and are not shown in order to avoid confusion in the drawing.

In one embodiment light olefins, such as a mixture of propylene and butylenes produced by the non-catalytic dehydrogenation or cracking of butane and also containing some isobutane as diluent, are passed from line 78 through line 80 to a polymerization system represented diagrammatically by rectangle 82. The polymerization is preferably carried out in the presence of a catalyst such as "solid" phosphorus acid, silica-alumina, sulfuric acid, or other well known polymerization catalyst. For example, a synthetic silica-alumina catalyst, such as one prepared by the process disclosed in U. S. Patent 2,142,324, may be used and the olefinic feed passed in contact therewith at 1500 pounds per square inch pressure and at temperatures varying from 200–500° F. depending upon the activity of the catalyst. Polymerization effluents are passed via line 84 into a fractionation system represented diagrammatically by column 86, which will comprise in actuality a plurality of fractionators and associated equipment. A heavy polymer cut of desired boiling range, preferably 330–380° F., is removed via line 20, while other olefinic constituents of the effluent are recovered and either recycled to the polymerizer or segregated and utilized for other purposes. For example, a bottoms polymer boiling above 380° F. may be removed through line 88. Any low-boiling unreacted propylene and/or butylene may be removed via line 90 and recycled to the polymerization via lines 98 and 80. Normally liquid polymers boiling below 330° F. may be recovered through lines 92 and 94 and used as such, or after hydrogenation, in motor fuels or aviation fuels. One or more fractions or portions, or all, of such intermediate olefins may be recycled to the polymerizer via lines 96, 98 and 80 in order to increase the production of the desired heavy polymers. Excess butane may also be removed through lines 90 and 98 and returned to the polymerizer or preferably passed by means not shown to cracking or dehydrogenation for the further production of light olefins. Alternately or additionally, such butane may be recovered via lines 68 and 60 and passed to dehydrogenation. Any desired portion thereof may be passed via lines 68 and 52 for use as diluent in the desulfurization step to be described later.

The selected fraction of heavy olefin polymers is passed via line 20 to the mercaptan synthesis stage represented diagrammatically by rectangle 12. Hydrogen sulfide in at least a stoichiometrical amount, and preferably in considerable molar excess, is passed to the mercaptan forming stage from line 14. A substantial part of the hydrogen sulfide is recycled from line 18 while make-up hydrogen sulfide is added from any source via line 16. Additional heavy polymers may be introduced from line 10 from an available source, or olefins introduced through line 10 may in some cases constitute the sole net olefin charge to the system. Preferably a substantial proportion of propane is used in the mercaptan forming reaction as diluent as disclosed in my copending application Serial No. 493,465, filed July 3, 1943. Such propane is obtained from recycle line 18, with make-up propane being introduced through line 16 or otherwise, and is passed via line 14 into unit 12. The reaction in unit 12 may be catalytic or non-catalytic, although preferably the former. The conditions to be used will vary in accordance with the nature of the reaction. In the event that a synthetic silica-alumina catalyst is used temperatures may range from about 100 to about 400° F. If a liquid hydrogen fluoride catalyst is used substantially atmospheric temperatures are ordinarily adequate. Conditions for the use of other known catalysts are known to the art and the optimum conditions when using a particular olefinic feed are readily determined by trial. Usually superatmospheric pressures are utilized and the reaction may be carried out in liquid, vapor or mixed phase. The proportion of heavy mercaptans to lighter mercaptans in the product will vary greatly with catalysts and temperatures used. A balance will be struck between, on the one hand, conditions sufficiently mild to produce a minimum of lower-boiling mercaptans, in which case the quantity to be treated further in accordance with this invention will be relatively small, and, on the other hand, more severe conditions giving a more rapid formation of mercaptans with concomitant production of larger quantities of lighter mercaptans, which will be subsequently desulfurized and the components thereof recovered.

Effluents from the mercaptan-forming step are passed via line 24 to a first stage separator 26. In the preferred process being described the pressure is lowered sufficiently in this separator to flash off substantially all of the hydrogen sulfide and a large proportion of the propane, and these materials are removed through line 28 and recycled to the reaction zone 12 by lines 18 and 14. The liquid phase from separator 26 is passed via line 30 into a second stage separator 32 which is operated at lower, preferably subatmospheric, pressures. From separator 32 a gaseous fraction is removed via line 46 containing substantially all of the butyl mercaptans and lighter (if any), together with residual propane. Octyl mercaptans may also be recovered at this point if desired, but preferably remain in the liquid phase together with the high-boiling mercaptan product and unreacted polymers. This liquid is passed via line 34 to a vacuum distillation means 36, which may for example be operated at 100 mm. Hg or less absolute pressure and at 200 to 300° F. This unit may, for example, comprise a 30 plate column of relatively large diameter operated at 30 mm. pressure and 300° F. A heavy mercaptan product is removed through line 38 and comprises about 95 per cent or more $C_{12}$—$C_{14}$ alkyl mercaptans. This product has been found very useful as a modifier for synthetic rubbers. Inasmuch as a limited per-pass conversion is ordinarily effected in reactor 12, a relatively large amount of unreacted heavy olefins is recovered overhead from unit 36 and returned via line 22 to reaction zone 12 for further contact with hydrogen sulfide. In one manner of operating, a large amount of intermediate mercaptans is allowed to build up in the reaction mixture and is continuously stripped from the product and recycled through line 22 in admixture with recycle polymers. The net production of intermediate mercaptans, such as octyl mercaptans, is withdrawn through line 40 and passed through line 44 to admixture with lighter mercaptans and diluent from line 46. These intermediate mercaptans may be in admixture with heavy polymers, and such heavy polymers may be passed through line 44 without having an unduly adverse effect upon the subsequent desulfurization. However, in some cases it may be preferable to remove the intermediate mercaptans and heavy polymer through line 42, and by extraction with alcoholic caustic, close fractionation, or other known means (not shown) a separation may be made between the polymers and mercaptan. The thus-recovered intermediate mercaptans may then be introduced into line 44 by means not shown.

Light and/or intermediate mercaptans which have been formed as undesired by-products in reactor 12 and which have been recovered in the manner described or in other ways, are introduced from line 46 and/or line 44 through line 50 into desulfurization zone 54, preferably in admixture with propane or other diluent which may have been recovered from the mercaptan-forming stage as described. Alternately or additionally, a butane or other light paraffinic diluent may be introduced through line 52 either from an extraneous source via line 66, or preferably from the polymerization effluent separation system via line 68. The by-product mercaptans, with or without a diluent or diluents, may be desulfurized in unit 54 in the presence or absence of a catalyst. Preferably one of the solid desulfurization catalysts well known to the art, is used. In the case of a bauxite catalyst, the desulfurization may be carried out at 15 lb./sq. in. gage pressure and 650–700° F. A space velocity of 2 liquid volumes feed per volume catalyst per hour will usually produce a per pass conversion of 50 per cent or better depending upon the mercaptans present, the proportion of diluent, and the severity of conditions within the desulfurizer. The desulfurization effluent, comprising hydrogen sulfide, light olefins, particularly butylene and/or octenes, unconverted light and/or intermediate mercaptans, and diluent, passes via line 56 into a separation system indicated diagrammatically by column 62. The hydrogen sulfide and propane are recovered through line 72 and returned via lines 18 and 14 to the mercaptan-forming stage. Propane or other diluent may be separated if desired and passed via line 74 for re-use in desulfurizer 54. However, this is seldom necessary and hence not so desirable. Unconverted mercaptans may be recovered and returned via lines 64 and 52 to desulfurization. For example, butyl mercaptan may be removed through line 48 and octyl mercaptan through line 58. Light and intermediate olefins produced in the desulfurization are recovered through lines such as 76 and 77 and returned to polymerization unit 82 wherein they are polymerized to give increased yields of the heavy polymer fraction. In case propyl mercaptans are formed in unit 12, some propylene will be present in the desulfurization effluent. A portion of this propylene may in some conditions, because of its boiling point, be taken off overhead in unit 62 along with propane and hydrogen sulfide and thus be recycled to the mercaptan reaction. Suitable means may be applied for recovering this propylene if desired for reutilization in polymerization zone 82. However, propylene polymers are, generally speaking, more stable than butylene polymers, and accordingly only a small amount of propyl mercaptan is usually formed. Removal of part of the propylene will avoid its pyramiding in the system. In case a butane diluent has been used in desulfurization zone 54, it will be separated in the butylene fraction recovered from fractionation system 62 and returned via line 76 to the polymerization unit 82 as diluent for the polymerization reaction. Small amounts of heavy refractory material formed in the desulfurization are removed through line 70.

As an example of the operation of my invention the following data are provided. It will be understood, however, that these data are representative of one set of specific operating conditions in the various steps of the process, and are accordingly not to be construed as unduly limiting the invention.

A $C_3$—$C_4$ fraction obtained from the non-catalytic dehydrogenation of isobutane and containing butylenes and propylene in a ratio of about 4:1, together with butanes, largely isobutane, is passed into polymerization unit 82 at a rate of 429 pounds per hour. To this stream is added 23 lbs. per hour of olefins obtained by desulfurization of low-boiling mercaptans in unit 54. A synthetic silica-alumina catalyst is used in polymerizer 82. At 1500 lbs. pressure with a space velocity of 4–6 liquid volumes feed per volume catalyst per hour and at temperatures between 200–400° F. the olefins are converted to produce 305 lbs. per hour of polymer boiling from 330–380° F. Unconverted propylene and small amounts of unconverted butylenes are recycled to the polymerizer. An intermediate polymer cut consisting essentially of isoheptenes is removed at the rate of 98 lbs. per hour for utilization in another process. All intermediate fractions of olefins, that is those boiling below the isoheptene fraction and those boiling between the isoheptene fraction and 330° F., are recycled to the polymerizer. A heavy bottoms fraction of 49 lbs. per hour is removed through line 88.

The $C_{12}$—$C_{14}$ olefins boiling between 330–380° F. are passed via line 20 at a rate of 305 lbs. per hour to contact with a synthetic silica-alumina gel-type catalyst for conversion to mercaptans in unit 12. This stream is joined by stream 22 containing 695 lbs. per hour recycled unconverted heavy polymer and 932 lbs. per hour intermediate mercaptans comprising essentially $C_8$ mercaptans. Hydrogen sulfide at the rate of 312 lbs. per hour and propane at the rate of 936 lbs. per hour enter through line 14. The mercaptan synthesis is carried out at 700–1000 lbs. per sq. in., at a temperature of 200 to 300° F. depending upon the activity of the catalyst, and at a space velocity of from 1–2 liquid volumes feed per volume catalyst per hour. Effluents are flashed in unit 26 at 300° F. to a pressure of 75 lbs. gage. A gaseous overhead fraction containing 242 lbs. hydrogen sulfide and 890 lbs. propane per hour and also including about 7 lbs. light mercaptan, largely butyl mercaptan, is removed through line 28 and subject to compression and partial condensation by means not shown prior to returning same to the reactor. In this compression step the light mercaptan is recovered, usually along with some propane, and passed by means not shown into line 46. Liquid from the first stage 26 is heated and passed through line 30 into second stage stripper 32 at a temperature of 300° F. and a pressure of 5 lbs per sq. in. absolute. The overhead from unit 32 contains 46 lbs. propane and 20 lbs. butyl mercaptan per hour. As stated above, 7 lbs. butyl mercaptan recovered from the overhead in unit 26 is also added to the stream. The liquid from unit 32 is passed to unit 36 comprising a 30 plate column operated at 300° F. and 30 mm. mercury absolute pressure. From the bottom of unit 36 the desired heavy mercaptan product is recovered through line 38 at the rate of 338 lbs. per hour. Unconverted heavy polymer and intermediate mercaptans are recycled thru line 22 as described. A bleed stream containing 7 lbs. heavy polymer and 10 lbs. intermediate (octyl) mercaptan per hour is taken off through line 40 and passed to a small separation means in which the mercaptan is recovered. This mercaptan is passed to line 44 and represents the net production of intermediate mercaptans in the process. The recovered heavy olefin is passed to line 22.

The thus-recovered light and intermediate mercaptans in the amount of 37 lbs. per hour represents a normal loss of over 10 per cent based on the heavy mercaptan production. However, in accordance with the invention the stream containing same together with the propane diluent is passed over a bauxite catalyst in unit 54 at 650–700 F. and the effluents therefrom separated into various fractions as follows: 11 lbs. per hour hydrogen sulfide is recovered together with propane and returned via line 72 to unit 12, unconverted butyl and octyl mercaptans are recycled via lines 64 and 52 to the desulfurization unit, 17 lbs. per hour light olefins (butylene) and 6 lbs. per hour light liquid olefins (predominantly $C_8$) are recovered and passed to the polymerization unit 82, 3 lbs. per hour residue is drained through line 70. The ultimate result of this process is the production of 338 lbs. per hour of C₁₂—C₁₄ mercaptans from 59 lbs. per hour hydrogen sulfide and 282 lbs. per hour olefin.

The above example illustrates the advantageous savings made possible through the practice of my invention in a mercaptan-producing process which utilizes a catalyst and conditions selected to give a limited amount of low-boiling mercaptans produced as by-products. It will be appreciated that in the event a less selective catalyst and/or more severe conditions were utilized in the mercaptan synthesis even greater savings would be realized. While the foregoing disclosure has included detailed descriptions of particular operations and shown outstanding advantages of this invention, and has further illustrated a specific application thereof, other applications and modifications may be practiced without departing from the spirit of the invention.

I claim:

1. A process for producing high-boiling mercaptans which comprises passing an admixture of a low-boiling paraffinic hydrocarbon diluent, hydrogen sulfide, and an olefin polymer fraction, in contact with a mercaptan synthesis catalyst under conditions effecting formation of mercaptans having the same number of carbon atoms per molecule as said polymer and also mercaptans having fewer carbon atoms per molecule than said polymer, passing the resulting reaction mixture to a first flash chamber and therein flashing same to produce a liquid fraction comprising the mercaptans so produced in admixture with at least part of said low-boiling paraffinic hydrocarbon diluent and a gaseous fraction comprising hydrogen sulfide, recovering said gaseous fraction and returning same to contact with said catalyst for reaction with polymer to form mercaptans, passing said liquid fraction to a second flash chamber and therein flashing same to produce a second liquid fraction comprising mercaptans having the same number of carbon atoms per molecule as said polymer and a second gas fraction comprising mercaptans having fewer carbon atoms per molecule than said polymer diluted with said low-boiling paraffinic hydrocarbon diluent, recovering from said second liquid fraction as product of the process mercaptans having the same number of carbon atoms per molecule as said polymer, passing the aforesaid second gas fraction containing said mercaptans and diluent in contact with a desulfurization catalyst at temperatures and space velocities such that at least part of the mercaptan content of the feed is converted into hydrogen sulfide and the corresponding light olefins having fewer carbon atoms per molecule than said polymer, separating from the effluents hydrogen sulfide, low-boiling paraffinic hydrocarbon diluent, and said light olefins, returning the said hydrogen sulfide to contact with said catalyst, subjecting said light olefin to catalytic polymerization in the presence of low-boiling paraffinic hydrocarbon diluent separated from said desulfurization effluents to form olefin polymers having at least 12 carbon atoms per molecule, and passing said polymers to contact with said catalyst to increase the yield of high-boiling mercaptans in the process.

2. The process of claim 1 in which said low-boiling paraffinic hydrocarbon material comprises propane.

3. The process of claim 1 in which said low-boiling paraffinic hydrocarbon material comprises a butane.

4. A process for producing mercaptans having at least eight carbon atoms per molecule which comprises subjecting butenes in admixture with a butane diluent to catalytic polymerization, recovering from the effluents an olefin polymer material having at least eight carbon atoms per molecule, also separating butane from the effluents and passing at least a portion of same as diluent to a catalytic desulfurization step hereinafter described, reacting said olefin polymer material with a molar excess of hydrogen sulfide in the presence of a catalyst under conditions forming a mercaptan product having at least eight carbon atoms per molecule and also forming mercaptans having lower molecular weight than said product, recovering said mercaptan product, recovering at least a portion of said lower molecular weight mercaptans and passing same in admixture with said butane diluent at elevated temperatures in contact with a solid desulfurization catalyst, recovering from effluents of said catalytic desulfurization step a mixture of butenes and butane, and passing same to said polymerization step.

5. The process of claim 4 in which a mercaptan product having at least twelve carbon atoms per molecule is produced, and in which said lower molecular weight mercaptans include butyl and octyl mercaptans.

6. A process for producing high-boiling mercaptans having at least twelve carbon atoms per molecule which comprises passing an admixture of a low-boiling paraffinic hydrocarbon diluent, hydrogen sulfide, and an olefin polymer fraction having at least 12 carbon atoms per molecule, in contact with a mercaptan synthesis catalyst under conditions effecting formation of mercaptans having at least 12 carbon atoms per molecule and also mercaptans having 4 and 8 carbon atoms per molecule, passing the resulting reaction mixture to a first flash chamber and therein flashing same to produce a liquid fraction comprising mercaptans having 4 and more carbon atoms per molecule and part of the low-boiling paraffinic hydrocarbon diluent and a gaseous fraction comprising all the hydrogen sulfide and the remainder of the low-boiling paraffinic hydrocarbon diluent, recovering said gaseous fraction and returning same to contact with said catalyst, passing said liquid fraction to a second flash chamber and therein flashing same to produce a second liquid fraction comprising mercaptans having 8 and more carbon atoms per molecule and a second gas fraction comprising mercaptans of 4 carbon atoms per molecule diluted with said low-boiling paraffinic hydrocarbon, and subjecting said second liquid fraction to distillation to recover therefrom as the product of the process mercaptans having at least 12 carbon atoms per molecule, passing the aforesaid second gas fraction in contact with a desulfurization catalyst at temperatures and space velocities such that at least part of the mercaptan content of the feed is converted into the corresponding light olefins and hydrogen sulfide, subjecting the effluents to fractionation to separate therefrom hydrogen sulfide, low-boiling paraffinic hydrocarbon diluent, and said light olefins, returning said hydrogen sulfide and said low-boiling paraffinic hydrocarbon diluent to contact with said catalyst, subjecting said light olefins to catalytic polymerization to form olefin polymers having at least 12 carbon atoms per molecule, and passing said polymers to contact with said catalyst to increase the yield of high-boiling mercaptans in the process.

7. The process of claim 6 in which said low-boiling paraffinic hydrocarbon diluent comprises propane.

8. The process of claim 6 in which said low-boiling paraffinic hydrocarbon diluent comprises butane.

9. A process for producing high-boiling mercaptans having at least twelve carbon atoms per molecule which comprises passing an admixture of a propane diluent, hydrogen sulfide, and an olefin polymer fraction having at least 12 carbon atoms per molecule, in contact with a synthetic silica-alumina gel-type catalyst at temperatures within the range of about 100 to 400° F., under conditions effecting formation of mercaptans having at least 12 carbon atoms per molecule and also mercaptans having 4 and 8 carbon atoms per molecule, passing the resulting reaction mixture to a first flash chamber and therein flashing same to produce a liquid fraction comprising mercaptans having 4 and more carbon atoms per molecule and part of the propane and a gaseous fraction comprising all the hydrogen sulfide and the remainder of the propane, recovering said gaseous fraction and returning same to contact with said catalyst, passing said liquid fraction to a second flash chamber and therein flashing same at subatmospheric pressures to produce a second liquid fraction comprising mercaptans having 8 and more carbon atoms per molecule and a second gas fraction comprising mercaptans of 4 carbon atoms per molecule diluted with propane, subjecting said second liquid fraction to vacuum distillation to recover as bottoms product mercaptans having at least 12 carbon atoms per molecule and to recover as overhead a material comprising unreacted olefin polymers which are returned to contact with said catalyst, passing the aforesaid second gas fraction in contact with a bauxite desulfurization catalyst at temperatures within the range of about 650 to 700° F. at a space velocity such that at least about 50 per cent of the mercaptan content of the feed is converted into the corresponding light olefins and hydrogen sulfide, subjecting the effluents to fractionation to separate a gaseous fraction comprising hydrogen sulfide and propane diluent and another fraction comprising said light olefins, returning the said gaseous fraction to contact with said catalyst, subjecting said another fraction to catalytic polymerization to form olefin polymers having at least 12 carbon atoms per molecule, and passing said polymers to contact with said catalyst to increase the yield of high boiling mercaptans in the process.

10. The process of claim 9 in which the overhead material recovered by vacuum distillation from said second liquid fraction comprises mercaptans having 8 carbon atoms per molecule, said mercaptans are separated from admixture with unreacted olefin polymers, and the thus-separated 8-carbon-atom mercaptans are admixed with said second gas fraction for subsequent desulfurization as described.

WALTER A. SCHULZE.

REFERENCES CITED

The following references are of record in the file of this patent:

UNITED STATES PATENTS

| Number | Name | Date |
|---|---|---|
| 1,836,170 | Johansen | Dec. 15, 1931 |
| 1,836,183 | Nisson | Dec. 15, 1931 |
| 2,052,268 | Williams | Aug. 25, 1936 |
| 2,211,990 | Shoemaker | Aug. 20, 1940 |
| 2,252,138 | Rutherford | Aug. 12, 1941 |
| 2,173,482 | Keunecke | Sept. 19, 1939 |
| 2,162,319 | Schulze | June 13, 1939 |
| 2,167,602 | Schulze | July 25, 1939 |